United States Patent
Xu

(10) Patent No.: US 7,327,814 B1
(45) Date of Patent: Feb. 5, 2008

(54) AMPLITUDE AND BANDWIDTH PRE-EMPHASIS OF A DATA SIGNAL

(75) Inventor: Chao Xu, Suwanee, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 36 days.

(21) Appl. No.: 11/422,252

(22) Filed: Jun. 5, 2006

(51) Int. Cl.
*H04B 1/10* (2006.01)

(52) U.S. Cl. ...................... 375/350; 375/295

(58) Field of Classification Search ........ 375/346–350, 375/295, 316; 326/21, 26
See application file for complete search history.

(56) References Cited

U.S. PATENT DOCUMENTS 5,659,581 A * 8/1997 Betts et al. ................. 375/296
6,897,685 B2 5/2005 Sato
6,956,407 B2 10/2005 Baig
7,206,337 B2 * 4/2007 Tonietto et al. ............. 375/220

* cited by examiner

*Primary Examiner*—Don Le
(74) *Attorney, Agent, or Firm*—Glass & Associates; Kenneth Glass

(57) ABSTRACT

A data transmitter pre-emphasizes the amplitude and frequency bandwidth of a data signal. A data tap generator delays the data signal to generate multiple data tap signals, each of which is delayed by an integer multiple of a data period. A delay module further delays one of the data tap signals by a delay time that is less than the data period to generate a delayed data signal. The delay time of the delayed data signal determines a frequency bandwidth pre-emphasis for the data signal. A filter module multiplies the amplitudes of the data tap signals and the delayed data signal by coefficients to generate signal components of a pre-emphasized data signal. The coefficients of the filter module determine the amplitude pre-emphasis for the data signal. The filter module sums the signal components to generate the pre-emphasized data signal, which includes both the frequency bandwidth pre-emphasis and the amplitude pre-emphasis.

20 Claims, 9 Drawing Sheets

AMPLITUDE AND BANDWIDTH PRE-EMPHASIS OF A DATA SIGNAL

BACKGROUND

1. Field of the Invention

The present invention generally relates to data communications, and more particularly to pre-emphasizing a data signal.

2. Description of Related Art

High-speed data transmitters often include circuitry for pre-emphasizing a data signal to compensate for transmission losses occurring in a transmission channel. The transmission losses include frequency dependent losses in amplitudes of the data signal. Before transmission, data is encoded in the data signal by using a voltage level to represent a data value of zero and another voltage level to represent a data value of one. After transmission at sufficiently high data rates, losses occur in the amplitude of the data signal at transitions between the levels. Additionally, losses vary across frequency components of the data signal, which affects the frequency bandwidth of the data signal. As a result of these frequency dependent transmission losses, the data signal is distorted after transmission. To compensate for these transmissions losses, the data signal is pre-emphasized prior to transmission.

One technique for pre-emphasizing a data signal involves emphasizing the amplitude of the data signal at each transition between levels to compensate for losses in amplitude that occur during transmission. Another technique for pre-emphasizing a data signal involves emphasizing selected frequency components of the data signal to compensate for changes in frequency bandwidth that occur during transmission. Although each of these techniques has been successful in some circumstances, improvement in pre-emphasis of data signals is needed because of an ever-increasing need for higher data rates in data signals.

In light of the above, a need exists for improving pre-emphasis of a data signal.

SUMMARY

In various embodiments, a data transmitter pre-emphasizes the amplitude and frequency bandwidth of a data signal. A data tap generator delays the data signal to generate multiple data tap signals. Each data tap signal represents the data signal delayed by an integer multiple of a data period. A delay module further delays one of the data tap signals by a delay time to generate a delayed data signal. The delay time is less than the data period and determines a frequency bandwidth pre-emphasis. A filter module multiplies the amplitudes of the data tap signals and the delayed data signal by coefficients to generate signal components of a pre-emphasized data signal. The coefficients of the filter module determine an amplitude pre-emphasis. The filter module sums the signal components to generate the pre-emphasized data signal, which includes both the amplitude pre-emphasis and the frequency bandwidth pre-emphasis. Pre-emphasis of the data signal is improved because the pre-emphasis can compensate for losses in both amplitude and frequency bandwidth, which that may occur during transmission of the data signal.

A system for pre-emphasizing a data signal, in accordance with one embodiment, includes a data tap generator, a delay module, and a filter module. The data tap generator and the delay module are each coupled to the filter module. The data tap generator receives the data signal and generates data tap signals. Each data tap signal represents the data signal delayed by an integer multiple of a data period. The delay module generates a delayed data signal that represents one of the data tap signals further delayed by a delay time. The delay time is less than the data period. The filter module multiplies an amplitude of each data tap signal by a corresponding coefficient to generate a corresponding signal component. Additionally, the filter module multiplies an amplitude of the delayed data signal by a corresponding coefficient to generate a corresponding signal component. The filter module combines the signal components to generate a pre-emphasized data signal.

A method for pre-emphasizing a data signal, in accordance with one embodiment, includes receiving a data signal and generating data tap signals. Each data tap signal represents the data signal delayed by an integer multiple of a data period. The method also includes generating a delayed data signal that represents one of the data tap signals further delayed by a delay time. The delay time is less than the data period. The method further includes multiplying an amplitude of each data tap signal by a corresponding coefficient to generate a corresponding signal component. Additionally, the method includes multiplying an amplitude of the delayed data signal by a corresponding coefficient to generate a corresponding signal component. The method further includes combining the signal components to generate a pre-emphasized data signal.

A system for pre-emphasizing a data signal, in accordance with one embodiment, includes a means for generating data tap signals. Each data tap signal represents the data signal delayed by an integer multiple of a data period. The system also includes a means for generating a delayed data signal that represents one of the data tap signals further delayed by a delay time. The delay time is less than the data period. Additionally, the system includes a means for multiplying an amplitude of each data tap signal by a corresponding coefficient to generate a corresponding signal component. The system further includes a means for multiplying an amplitude of the delayed data signal by a corresponding coefficient to generate a corresponding signal component. The system also includes a means for combining the signal components to generate a pre-emphasized data signal.

A system, in accordance with one embodiment, includes a means for generating a signal component based on a data signal for determining a frequency bandwidth pre-emphasis of the data signal. The system also includes a means for generating signal components based on the data signal for determining an amplitude pre-emphasis of the data signal. The system further includes a means for combining the signal components to generate a pre-emphasized data signal that includes the amplitude pre-emphasis and the frequency bandwidth pre-emphasis.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, a data transmitter receives a data signal and generates signal components including an amplitude pre-emphasis for the data signal. The data transmitter also generates a signal component including a frequency bandwidth pre-emphasis for the data signal. The data transmitter combines the signal components to generate a pre-emphasized data signal that represents the data signal and includes the amplitude pre-emphasis and the frequency bandwidth pre-emphasis.

Figure 1:
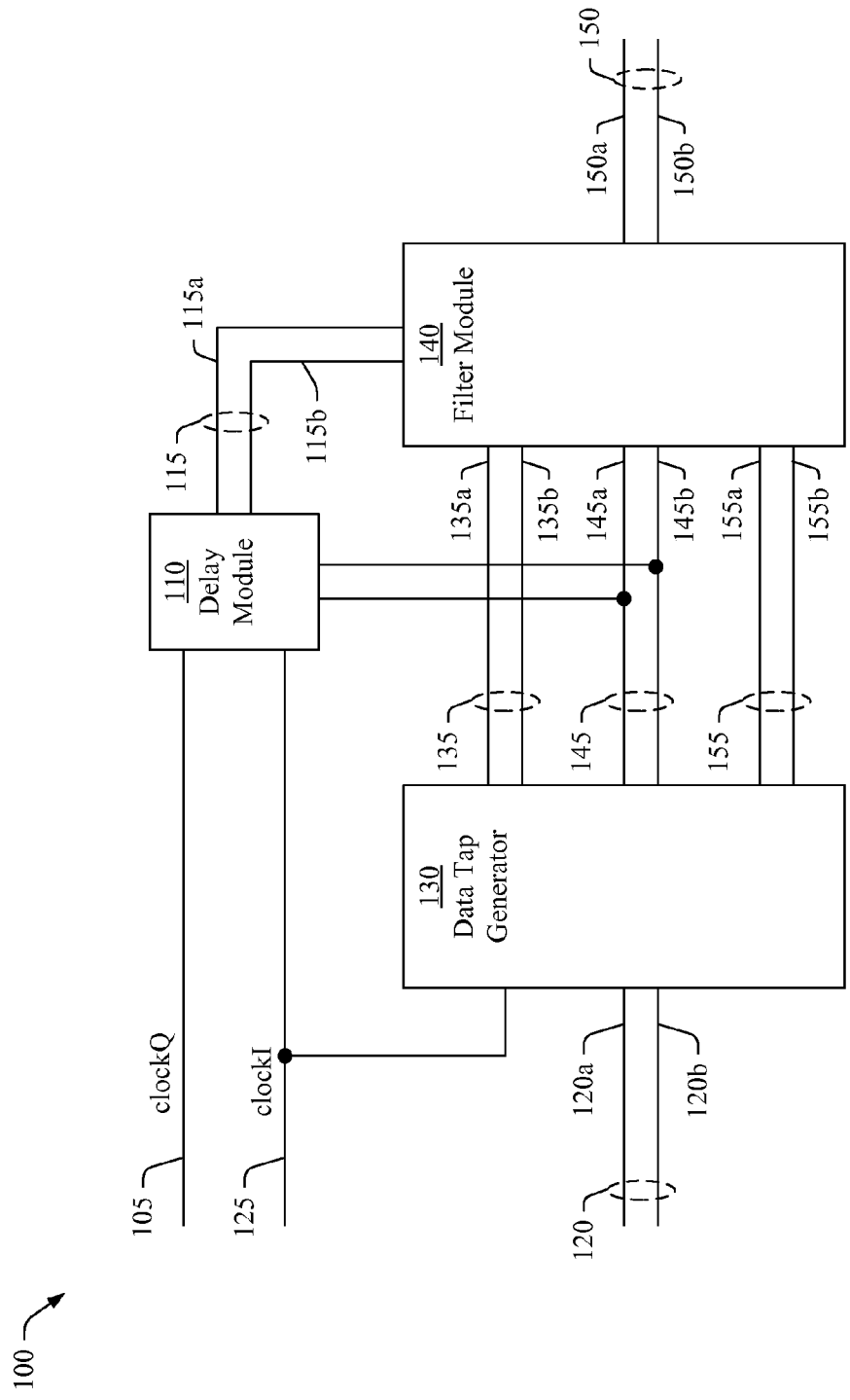
FIG. 1 is a block diagram of a data transmitter, in accordance with an embodiment of the present invention.

FIG. 1 illustrates a data transmitter 100, in accordance with an embodiment of the present invention. The data transmitter 100 includes a delay module 110, a data tap generator 130, and a filter module 140, which are coupled to each other. The data tap generator 130 receives a data signal 120 and a clock signal (clockI) 125, and generates data tap signals 135, 145, and 155. The data signal 120 represents data in successive time slots, each of which has a duration of a data period. In this way, each of the data tap signals 135, 145, and 155 represents the data signal 120 shifted in time (e.g., a time-shifted data signal). Each data tap signal 135, 145, and 155 represents the data signal 120 delayed by an integer multiple of the data period. The delay module 110 receives the clock signal 125, a clock signal (clockQ) 105, and the data tap signal 145, and generates a delayed data signal 115. The delayed data signal 115 represents the data tap signal 145 further delayed by a delay time that is not an integer multiple of the data period. For example, the delay time may be less than the data period. The filter module 140 filters the delayed data signal 115 and each data tap signal 135, 145, and 155 to generate a pre-emphasized data signal 150. The pre-emphasized data signal 150 represents the data signal 120 including an amplitude pre-emphasis and a frequency bandwidth pre-emphasis, as is described more fully herein.

In one embodiment, the data tap generator 130 generates the data tap signals 135, 145, and 155 such that one of the data tap signals (e.g., data tap signal 135) represents the data signal 120 delayed by one data period. Each of the remaining data tap signals (e.g., data tap signals 145 and 155) represents another data tap signal (e.g., data tap signal 135 or 145) delayed by one data period. In this way, each of the data tap signals 135, 145, and 155 represent the data signal 120 delayed by an integer multiple of the data period. Moreover, each data tap signal 135, 145, and 155 represents the data signal 120 delayed by a successive integer multiple of the data period. For example, the data tap signal 135 can represent the data signal 120 delayed by one data period, the data tap signal 145 can represent the data signal 120 delayed by two data periods, and the data tap signal 155 can represent the data signal 120 delayed by three data periods. Although three data tap signals 135, 145, and 155 are illustrated in FIG. 1, the data transmitter 100 may generate more or fewer data taps signals 135, 145, or 155 in other embodiments.

In one embodiment, the filter module 140 comprises a finite impulse response (FIR) filter defined by filter coefficients. The filter module 140 multiplies the delayed data signal 115 and the data tap signals 135 and 155 by corresponding filter coefficients and sums the resultant signal components with the data signal 145 to generate the pre-emphasized data signal 150. In an alternative embodiment, the filter module 140 also multiplies the data tap signal 145 by a corresponding filter coefficient to generate a signal component and sums the resultant signal components to generate the pre-emphasized data signal 150. The filter coefficients of the finite impulse response filter determine the amplitude pre-emphasis of the pre-emphasized data signal 150. The delay time of the delayed data signal 115 determines the frequency bandwidth pre-emphasis of the pre-emphasized data signal 150.

In various embodiments, the clock signals 105 and 125 are out of phase with each other by ninety-degrees (e.g., one-quarter of a clock period). For example, the clock signal 105 can be a quadrature clock signal and the clock signal 125 can be an in-phase clock signal, as would be appreciated by those skilled in the art. Further, each of the clock signals 105 and 125 have a clock period that is substantially the same as the data period of the data signal 120. In some embodiments, the data signal 120 is a differential signal including differential signal components $120a\text{-}b$, and the pre-emphasized data signal 150 is a differential data signal including signal components $150a\text{-}b$. Further, each of the data tap signals 135, 145, and 155 is a differential signal including respective differential signal components $135a\text{-}b$, $145a\text{-}b$, and $155a\text{-}b$. Additionally, the delayed data signal 115 is a differential signal including differential signal components $115a\text{-}b$. In other embodiments, the data tap generator 130 can generate more or fewer data tap signals 135, 145, or 155, and the delay module 110 can generate more than one delayed data signal 115. In these embodiments, the filter module 140 filters each data tap signal (e.g., data tap signals 135, 145, or 155) and each delayed data signal (e.g., delayed data signal 115) to generate the pre-emphasized data signal 150.

Figure 2:
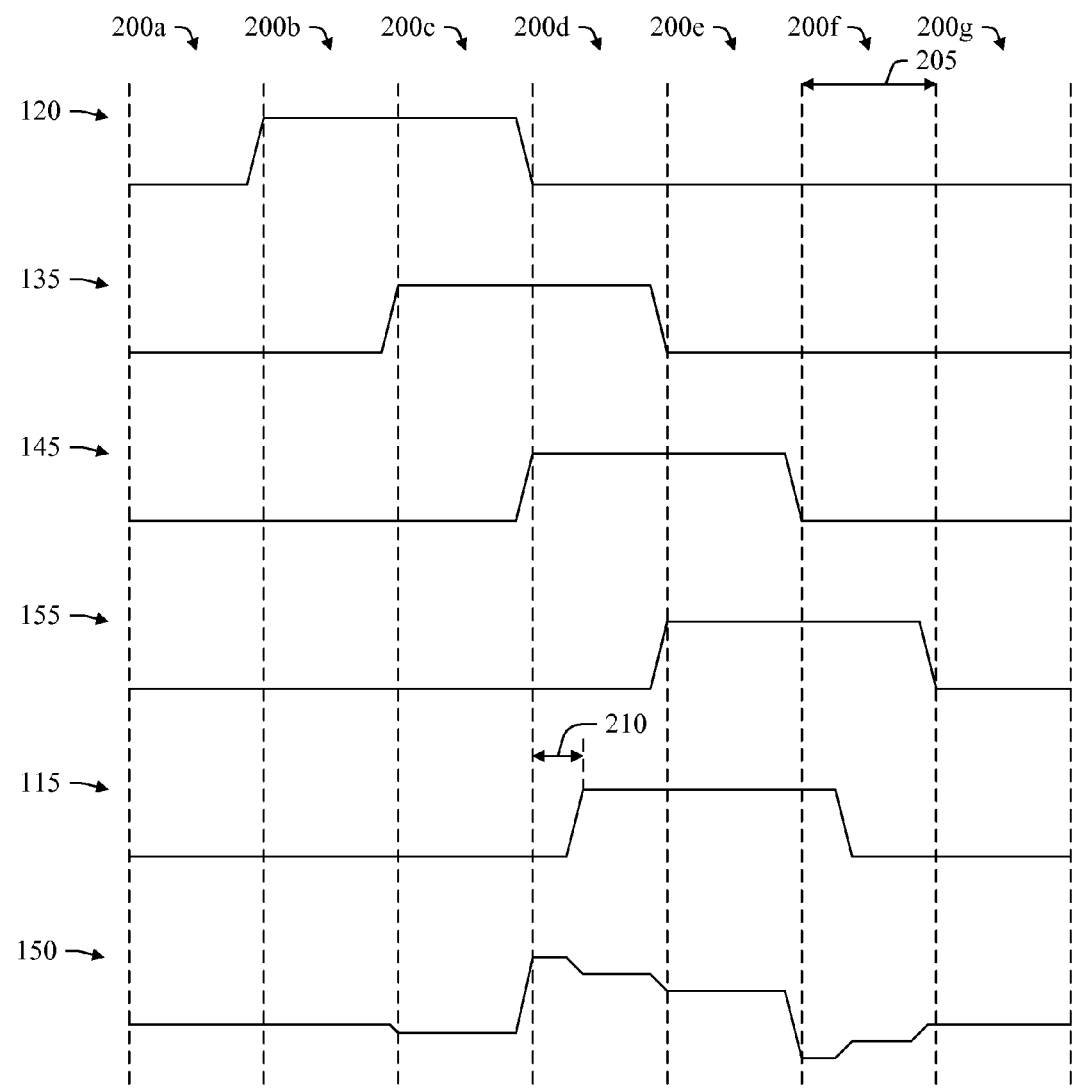
FIG. 2 is a timing diagram of an exemplary data signal, exemplary data tap signals, an exemplary delayed data signal, and an exemplary pre-emphasized data signal, in accordance with an embodiment of the present invention.

FIG. 2 illustrates an exemplary data signal 120, exemplary data tap signals 135, 145, and 155, and an exemplary delayed data signal 115, in accordance with an embodiment of the present invention. As illustrated, the data signal 120 includes time slots $200a\text{-}g$, each of which has duration of a data period 205. The data signal 120 represents a data value in each time slot 200. As illustrated, the data signal 120 represents a data value of one in time slots $200b$ and $200c$ and a data value of zero in each of the time slots $200a$ and $200d\text{-}g$. The data tap signals 135, 145, and 155 represent the data signal 120 delayed by one, two, and three data periods 205, respectively. The delayed data signal 115 represents the data tap signal 145 further delayed by a delay time 210 that is less than the data period. As illustrated in FIG. 2, the data tap signal 145 represents a current cursor of the data signal 120, the data tap signal 135 represents a pre-cursor of the data signal 120, and the data tap signal 155 represents a post-cursor of the data tap signal 120.

In various embodiments, the pre-emphasized data signal 150 may be represented by an equation based on the delayed data signal 115, the data taps signals 135, 145, and 155, and filter coefficients. For example, the voltages of the delayed data signal 115 and the data tap signals 135, 145, and 155 may be represented by corresponding variables $I_1$, $I_2$, $I_3$, and $I_4$, and the voltage of the pre-emphasized data signal 150 may be represented by the variable Z. Further, the filter coefficients of the delayed data signal 115 and the data tap signals 135, 145, and 155 may be represented by the corresponding constants $a_1$, $a_2$, $a_3$ and $a_4$. In this example, the voltage of the pre-emphasized data signal 150 is represented by the equation $Z=(a_1*I_1)+(a_2*I_2)+(a_3*I_3)+(a_4*I_4)$. In other embodiments, the equation representing the pre-emphasized data signal 150 may have more or fewer variables and constants corresponding to one or more delayed data signals (e.g., delayed data signal 115) and one or more data tap signal (e.g., data tap signals 135, 145, or 155).

In one embodiment, the data tap signal 145 (e.g., the current cursor of the data signal 120) is the predominant signal component of the pre-emphasized data signal 150 (FIG. 1). In this embodiment, the filter coefficient corresponding to the data signal 145 is equal to one, and the filter coefficients corresponding to the delayed data signal 115, the data tap signal 135, and the data tap signal 155 have magnitudes that are less than one. An example filter coefficient corresponding to the delayed data signal 115 is negative 0.2 (e.g., −0.2). An example filter coefficient corresponding to the data tap signal 135 is negative 0.1 (e.g., −0.1). An example filter coefficient corresponding to the data tap signal 155 is negative 0.3 (e.g., −0.3).

Figure 3:
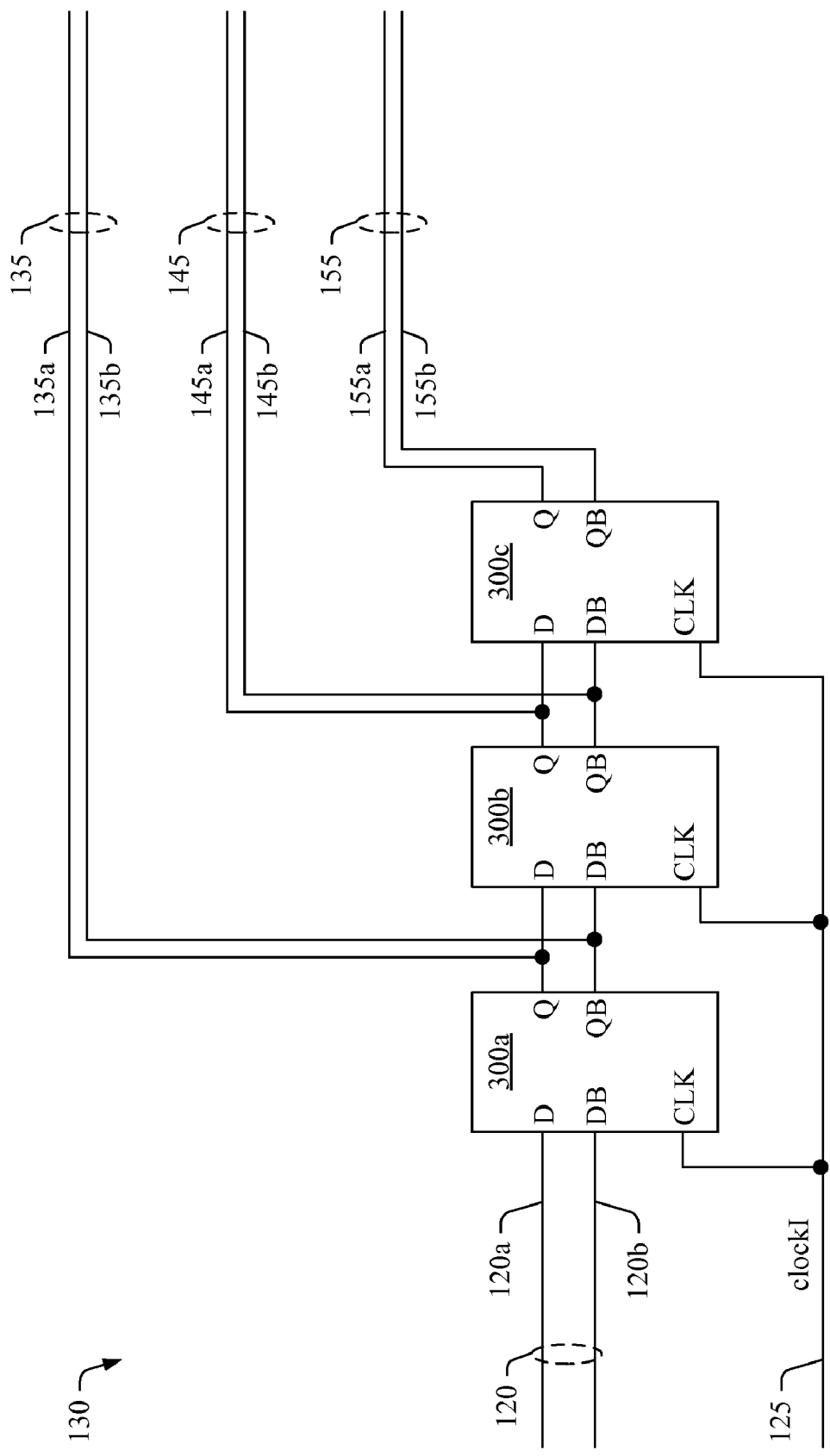
FIG. 3 is a block diagram of a data tap generator, in accordance with an embodiment of the present invention.

FIG. 3 illustrates the data tap generator 130, in accordance with an embodiment of the present invention. The data tap generator 130 includes three data flip-flops 300a-c, each of which receives the clock signal 125 as a clock input. The data flip-flop 300a is coupled to the data flip-flop 300b, and the data flip-flop 300b is coupled to the data flip-flop 300c. The clock signal 125 synchronizes operation of the data flip-flops 300a-c such that data propagates through each of the data flip-flops 300a-c in a data period 205 (FIG. 2). The data flip-flop 300a receives the data signal 120 as a data input and outputs the data tap signal 135. The data flip-flop 300b receives the data tap signal 135 as a data input and outputs the data tap signal 145. The data flip-flop 300c receives the data tap signal 145 as a data input and outputs the data tap signal 155. In various embodiments, the data signal 120 and the data tap signals 135, 145, and 155 are differential signals, as is described more fully herein. In these embodiments, each of the data flip-flops 300a-c may be a differential flip-flop, or the like.

Figure 4:
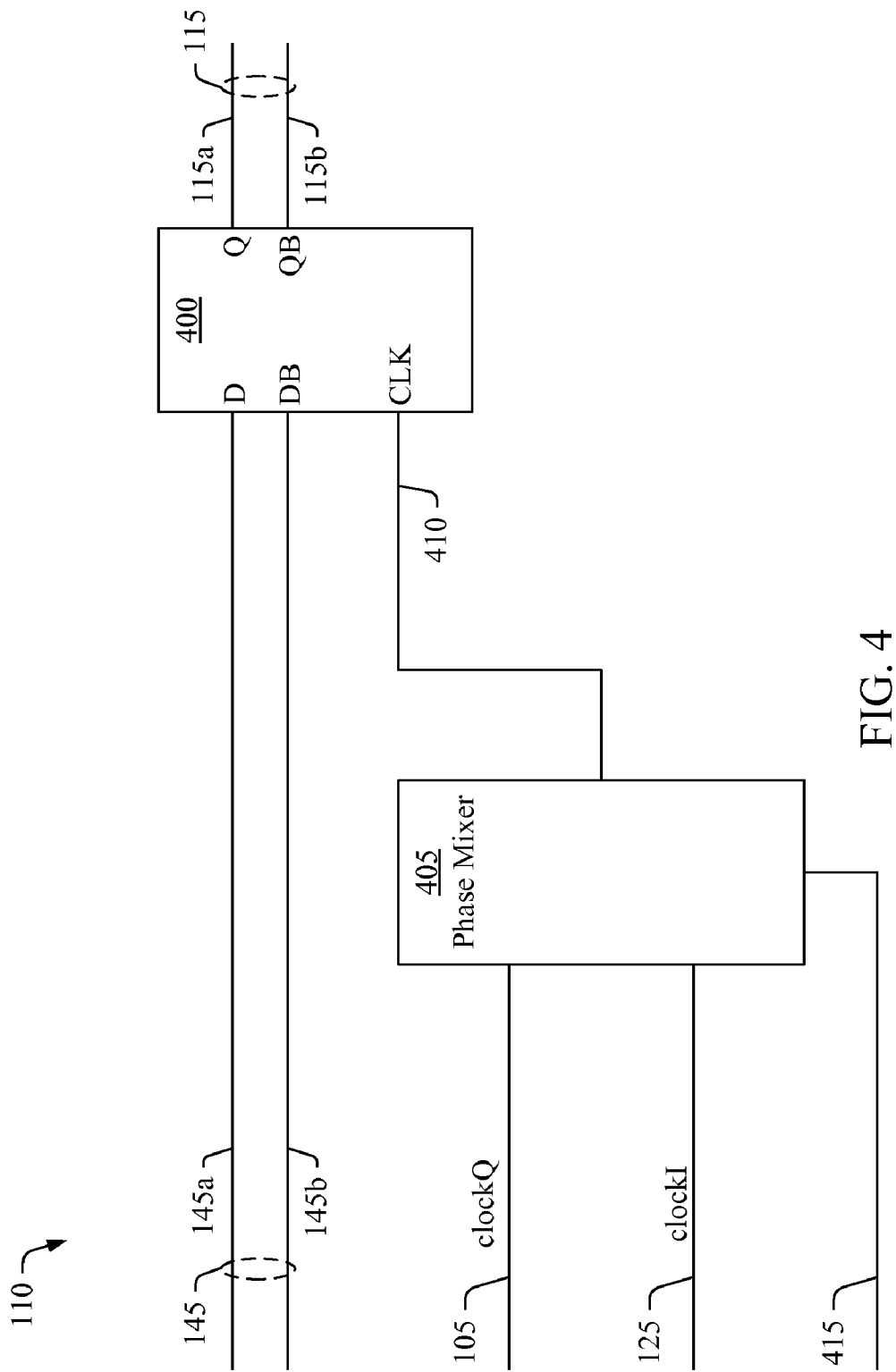
FIG. 4 is a block diagram of a delay module, in accordance with an embodiment of the present invention.

FIG. 4 illustrates the delay module 110, in accordance with an embodiment of the present invention. The delay module 110 includes a data flip-flop 400 and a phase mixer 405. The phase mixer 405 combines the clock signals 105 and 125 to generate a clock signal 410. The phase of the clock signal 410 is selectable within one clock period and determines the delay time 210 (FIG. 2) of the delayed data signal 115. The phase of the clock signal 410 is controlled by a control input 415. For example, the control input 415 may be an 8-bit data word. In this example, the phase of the output clock signal 410 is determined by the control input 415 and changes from zero to one clock period as the control input 415 changes value from zero to 255. In this way, the delay time 210 is selected based on the control input 415 and can be varied between zero and the delay period 205 (FIG. 2). In various embodiments, increasing the delay time 210 reduces the frequency bandwidth of the pre-emphasized data signal 150 and emphasizes lower frequency components of the pre-emphasized data signal. Conversely, reducing the delay time 210 increases the frequency bandwidth of the pre-emphasized data signal 150 and emphasizes higher frequency components of the pre-emphasized data signal 150.

The data flip-flop 400 receives the clock signal 410 as a clock input and the data tap signal 145 as a data input. The data flip-flop 400 outputs the delayed data signal 115, which represents the data tap signal 145 delayed by the delay time 210 (FIG. 2). In some embodiments, the data flip-flop 400 is a differential data flip-flop, or the like.

Figure 5:
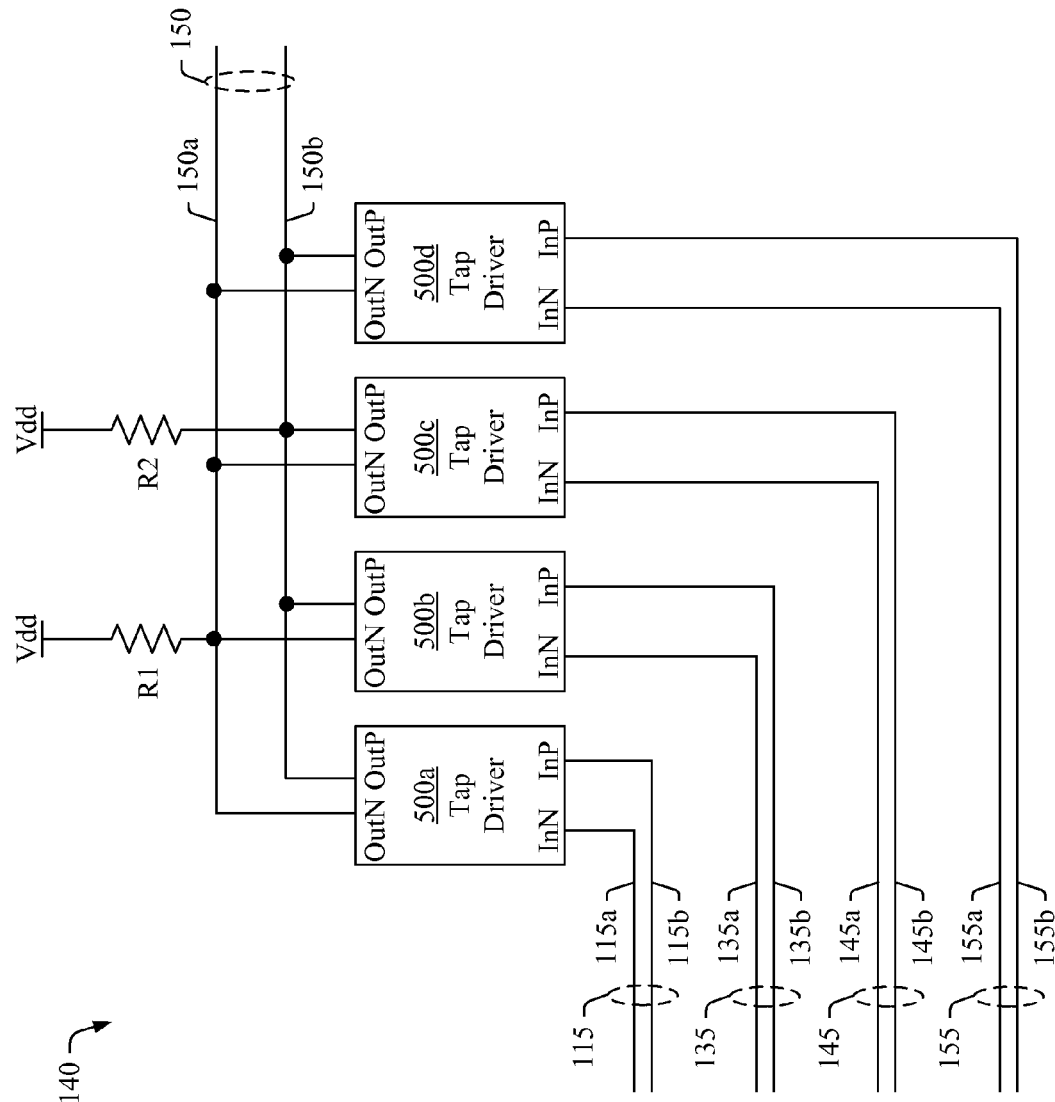
FIG. 5 is a block diagram of a filter module, in accordance with an embodiment of the present invention.

FIG. 5 illustrates the filter module 140, in accordance with an embodiment of the present invention. The filter module 140 includes tap drivers 500a-d. The tap driver 500a receives the delayed data signal 115 as an input and multiplies the input by a corresponding filter coefficient to generate an output. The tap drivers 500b-d receive the respective data tap signals 135, 145, and 155 as inputs, and each of the tap drivers 500b-d multiplies its input by a corresponding filter coefficient to generate an output. In one embodiment, the filter coefficients corresponding to the tap drivers 500a-d are determined by current sources in the tap drivers 500a-d, as is described more fully herein. The filter module 140 sums the outputs of the tap drivers 500a-d to generate the pre-emphasized data signal 150. Thus, the outputs of the tap drivers 500a-d are signal components of the pre-emphasized data signal 150. In one embodiment, each of the tap drivers 500a-d multiplies a voltage amplitude of its input to generate an output current. The filter module 140 then sums the output currents, which flow through a resistive load (e.g., resisters R1 and R2) to generate a voltage amplitude of the pre-emphasized data signal 150. In other embodiments, each tap driver 500a-d multiplies a current amplitude of its input to generate an output voltage, and the filter module 140 sums the output voltages to generate the voltage amplitude of the pre-emphasized data signal 150.

In one embodiment, the input to each tap driver 500a-d is a differential signal and the output of each tap driver 500a-d is a differential signal. In this embodiment, each tap driver 500a-d receives a differential signal at inputs InN and InP, and outputs a differential signal at outputs OutN and OutP. As illustrated, the filter module 140 includes resistors R1 and R2. One end of each resistor R1 and R2 is connected to the respective outputs OutN and OutP of each of the tap drivers 500a-d. The other end of each resistor R1 and R2 is connected to a power source (Vdd). The differential signal components output from the outputs OutN and OutP of the tap drivers 500a-d flow through the respective resistors R1 and R2 to form the corresponding signal components 150a and 150b of the pre-emphasized data signal 150.

Figure 6:
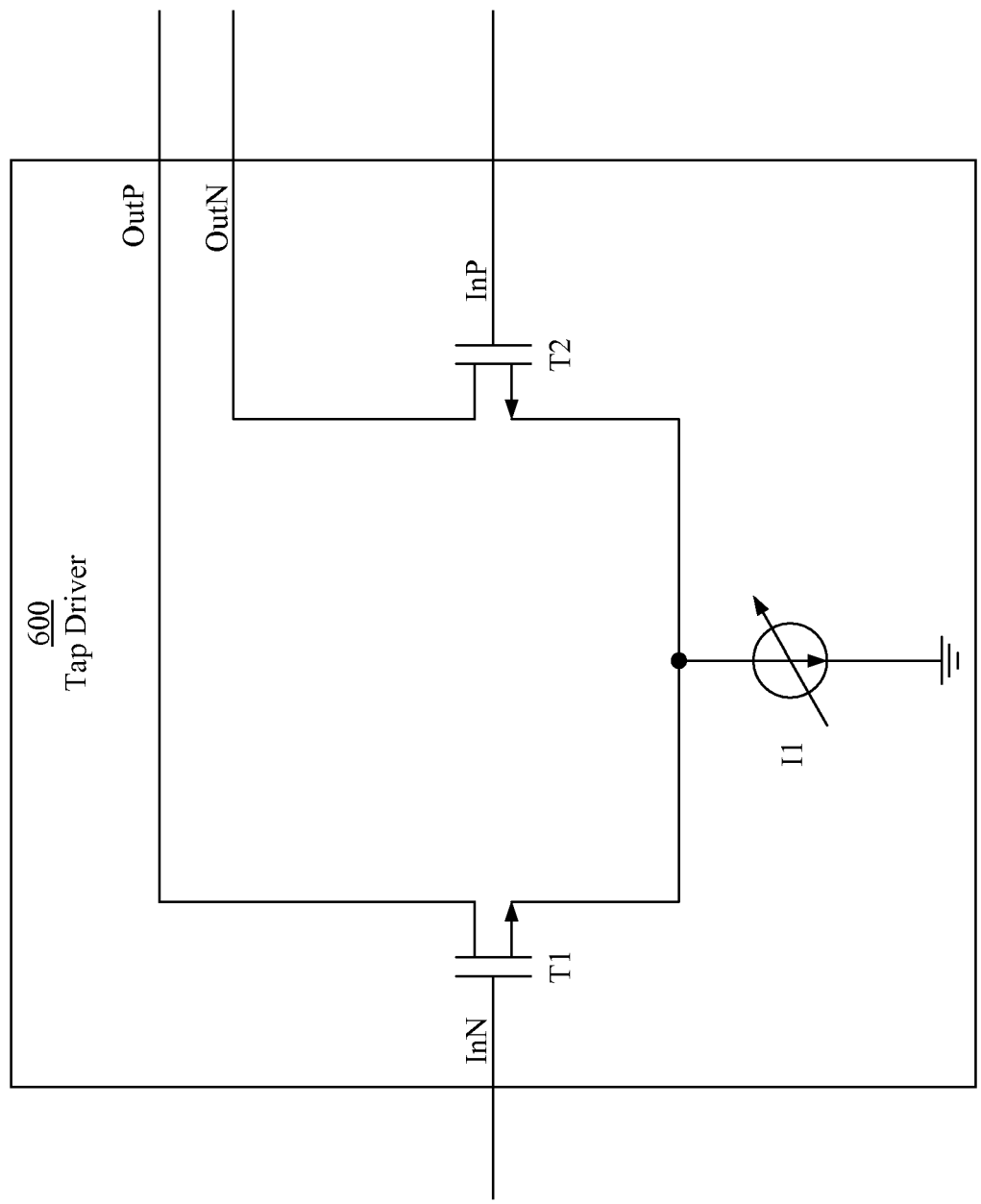
FIG. 6 is a block diagram of a tap driver, in accordance with an embodiment of the present invention.

FIG. 6 illustrates a tap driver 600, in accordance with an embodiment of the present invention. The tap driver 600 includes a transistor T1, a transistor T2, and a current source I1. The current of the current source I1 determines a filter coefficient for the tap driver 600. The transistors T1 and T2 can be any type of transistor such as, for example, an N-Type Metal-Oxide Semiconductor (NMOS) transistor. The drain of the transistor T1 is connected to the output OutP of the tap driver 600, and the drain of the transistor T2 is connected to the output OutN of the tap driver 600. The gate of the transistor T1 is connected to the input InN of the tap driver 600, and the gate of the transistor T2 is connected to the input InP of the tap driver 600. The source of each transistor T1 and T2 is connected to one end of the current source I1, and the other end of the current source I1 is connected to ground. The current source I1 generates a current, and the inputs InN and InP control the flow of the current from the current source I1 through the transistors T1 and T2 to the outputs OutN and OutP. In this way, the current generated by the current source I1 determines the filter coefficient of the tap driver 600. In some embodiments, the tap driver 600 may have a control input (not shown) for controlling the current of the current source I1. In this way, the filter coefficient of the tap driver 600 is selected based on the control input.

Figure 7:
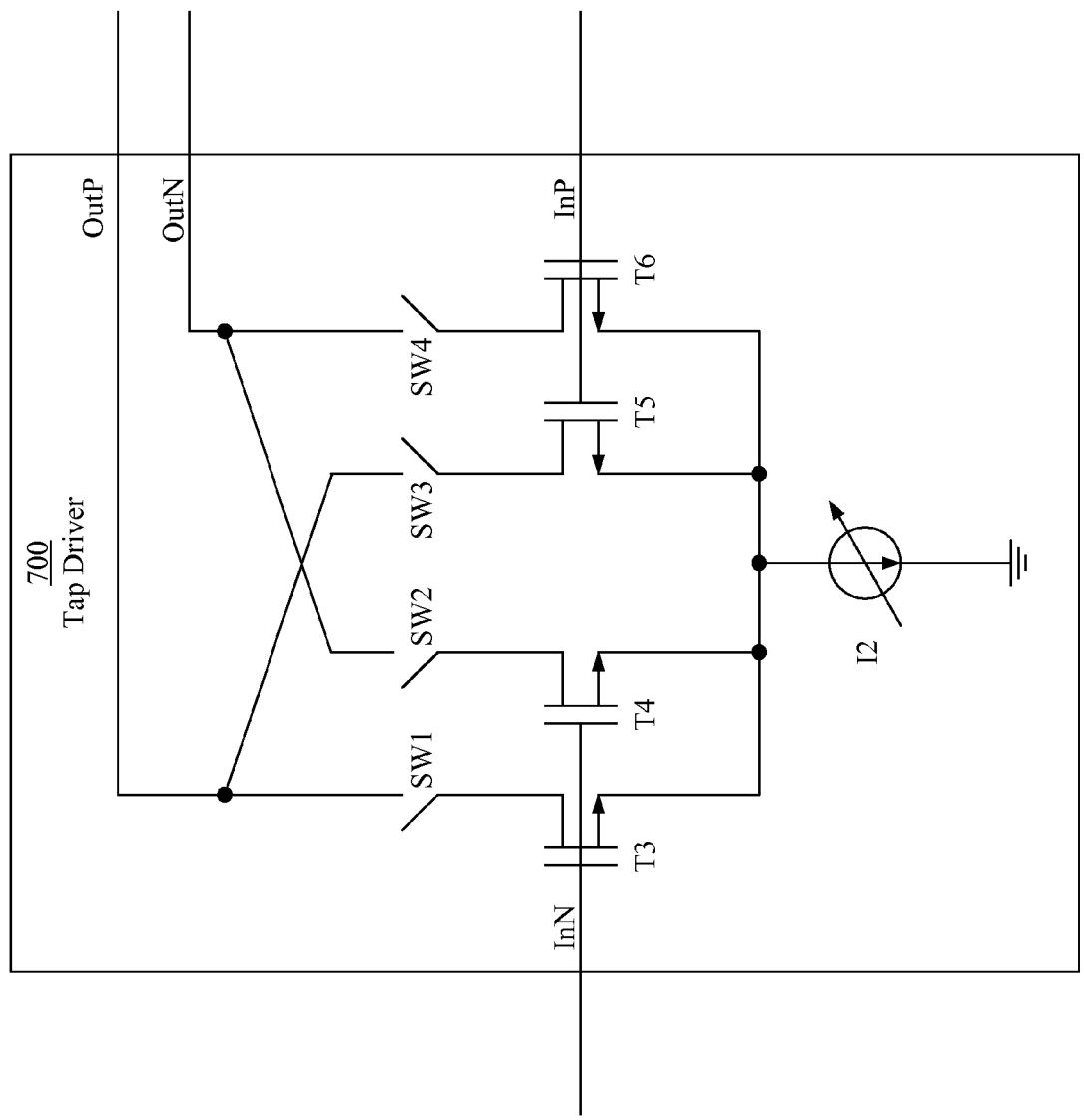
FIG. 7 is a block diagram of a tap driver, in accordance with an embodiment of the present invention.

FIG. 7 illustrates a tap driver 700, in accordance with an embodiment of the present invention. The tap driver 700 includes switches SW1-SW4, transistors T3-T6, and a current source I2. The current of the current source I2 determines a magnitude of a filter coefficient for the tap driver 700 and the configuration of the switches SW1-SW4 determines a sign (e.g., positive or negative) of the filter coefficient.

One end of the switch SW1 is connected to the output OutP of the tap driver 700 and the other end of the switch SW1 is connected to the drain of the transistor T3. One end of the switch SW2 is connected to the output OutN of the tap driver 700 and the other end of the switch SW2 is connected to the drain of the transistor T4. One end of the switch SW3 is connected to the output OutP of the tap driver 700 and the other end of the switch SW3 is connected to the drain of the transistor T5. One end of the switch SW4 is connected to the output OutN of the tap driver 700 and the other end of the switch SW4 is connected to the drain of the transistor T6. The gate of each transistor T3 and T4 is connected to the input InN of the tap driver 700, and the gate of each transistor T5 and T6 is connected to the input InP of the tap driver 700. The source of each transistor T3, T4, T5, and T6 is connected to one end of the current source I2, and the other end of the current source I2 is connected to ground. The current source I2 generates a current, and the inputs InN and InP control the flow of the current from the current source I2 through the transistors T3, T4, T5, and T6 to the outputs OutN and OutP depending upon the configuration of the switches SW1-SW4.

In a first configuration, the switches SW1 and SW4 are closed and the switches SW2 and SW3 are open. In this first configuration, the inputs InN and InP control the flow of current from the current source I2 through the transistors T3 and T6 to the respective outputs OutP and OutN. In a second configuration, the switches SW2 and SW3 are closed and the switches SW1 and SW4 are open. In this second configuration, the inputs InN and InP control the flow of current from the current source I2 through the transistors T4 and T5 to the respective outputs OutN and OutP. As may be envisioned from FIG. 7, the signals at the outputs OutN and OutP of the tap driver 700 in the second configuration are reversed from the signals at the outputs OutN and OutP of the tap driver 700 in the first configuration. In this way, the current generated by the current source I2 determines a positive filter coefficient of the tap driver 700 in the first configuration and a negative filter coefficient of the tap driver 700 in the second configuration.

In some embodiments, the current generated by the current source I2 may be controlled to select the filter coefficients of the tap driver 700. For example, the tap driver 700 may have a control input (not shown) for selecting the current of the current source I2. In this way, the filter coefficient of the tap driver 700 is selected based on the control input and the configuration of the switches SW1-SW4. In some embodiments, the switches SW1-SW4 are electrical switches, such as transistors. In these embodiments, the tap driver 700 includes control inputs (not shown) for actuating the switches SW1-SW4.

In various embodiments, the filter module 140 may include a combination of tap drivers 600 and 700. Each tap driver 600 has a positive filter coefficient based on the current of the current source I1 in the tap driver 600. Each tap driver 700 has a positive or negative coefficient based on the current of the current source I2 in the tap driver 700 and the configuration of the switches SW1-SW4 in the tap driver 700. In one embodiment, the tap driver 500c includes the tap driver 600 and each of the remaining tap drivers 500a, 500b, and 500d includes a corresponding tap driver 700. In this embodiment, the tap driver 500c determines a positive filter coefficient for the data tap signal 145 (e.g., the current cursor). Each of the remaining tap drivers 500a, 500b, and 500d determine a positive or negative filter coefficient corresponding to the delayed data signal 115, the data tap signal 135 (e.g., the pre-cursor), and the data tap signal 155 (e.g., the post-cursor). In this way, the filter coefficients of the filter module 140 may be selected to configure the filter module 140 as a finite impulse response filter and to select the amplitude pre-emphasis of the pre-emphasized data signal 150.

Figure 8:
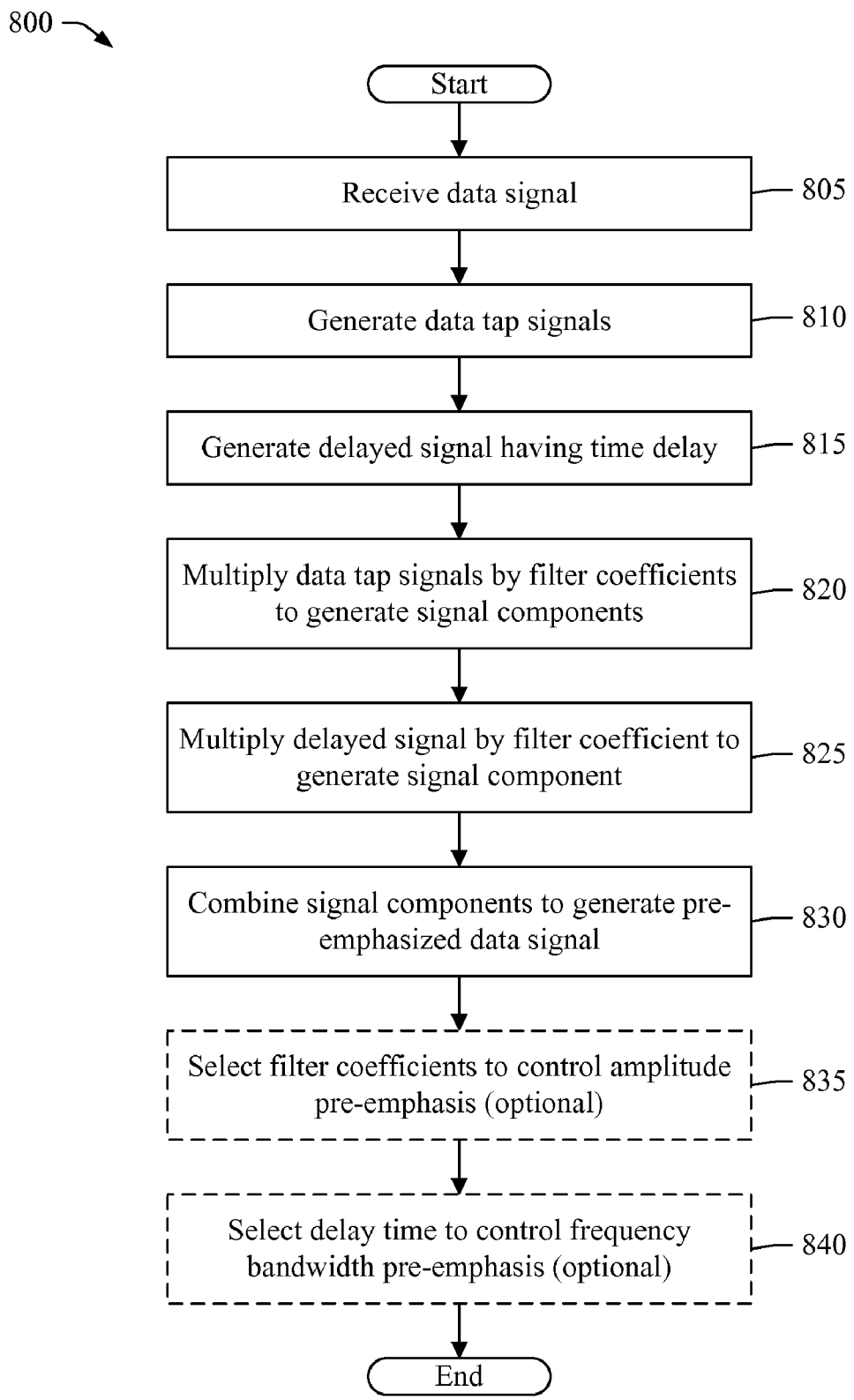
FIG. 8 is a flow chart for a method of pre-emphasizing a data signal, in accordance with an embodiment of the present invention.

FIG. 8 illustrates a method 800 of pre-emphasizing a data signal, in accordance with an embodiment of the present invention. In step 805, the data tap generator 130 receives a data signal 120. In some embodiments, the data signal 120 may be a differential signal having differential signal components 120a-b. The method 800 then proceeds to step 810.

In step 810, the data tap generator 130 generates the data tap signals 135, 145, and 155. The data taps signals 135, 145, and 155 represent the data signal 120 delayed by an integer multiple of the data period 205 of the data signal 120. In some embodiments, the data tap signals 135, 145, and 155 are differential signals having respective differential signal components 135a-b, 145a-b, and 155a-b. The method 800 then proceeds to step 815.

In step 815, the delay module 110 generates the delayed data signal 115. The delayed data signal 115 represents the data tap signal 145 further delayed by the delay time 210. The delay time 210 is less than the data period 205. In some embodiments, the delayed data signal 115 is a differential signal having differential signal components 115a-b. The method 800 then proceeds to step 820.

In step 820, the filter module 140 multiplies the data tap signals 135, 145, and 155 by corresponding filter coefficients to generate signal components for the pre-emphasized data signal 150. In one embodiment, the filter module 140 multiplies amplitudes of the data tap signals 135, 145, 155 by the corresponding filter components to generate the signal components. In various embodiments, the amplitudes of the data tap signals 135, 145, and 155 may be voltage amplitudes or current amplitudes. The method 800 then proceeds to step 825.

In step 825, the filter module 140 multiplies the delayed data signal 115 by a corresponding filter coefficient to generate a signal component for the pre-emphasized data signal 150. In one embodiment, the filter module 140 multiplies an amplitude of the delayed data signal 115 by the corresponding coefficient to generate the signal component. In various embodiments, the amplitude of the delayed data signal may be a voltage amplitude or a current amplitude. The method 800 then proceeds to step 830.

In step 830, the filter module 140 combines the signals components generated in steps 820 and 825 to generate the pre-emphasized data signal 150. In some embodiments, the pre-emphasized data signal 150 is a differential signal having differential signal components 150a-b. The method 800 then proceeds to step 835.

In optional step 835, the filter coefficients are selected to control the amplitude pre-emphasis of the pre-emphasized data signal 150. In one embodiment, the filter coefficients are selected by controlling the current of the current source (e.g., I1 or I2) in each tap driver (e.g., tap driver 600 or 700) of the filter module 140. In a further embodiment, the filter coefficients may be selected by configuring switches (e.g., switches SW1-SW4) in one or more of the tap drivers (e.g., tap driver 700). The method 800 then proceeds to step 840.

In optional step 840, the delay time 210 is selected to control the frequency bandwidth pre-emphasis of the pre-emphasized data signal 150. In one embodiment, the phase mixer 405 determines the delay time 210 based on the control input 415 of the phase mixer 450. The method 800 then ends.

In some embodiments, the steps 805-840 of the method 800 illustrated in FIG. 8 may be performed in a different order. For example, step 825 may be performed before step 820 in one embodiment. In various embodiments, some of the steps 805-840 may be performed in parallel with each other. For examples, steps 820 and 825 may be performed in parallel in one embodiment. In some embodiments, some of the steps 805-840 may be performed at substantially the same time. For example, steps 820, 825 and 830 may be performed substantially simultaneously in one embodiment.

Figure 9:
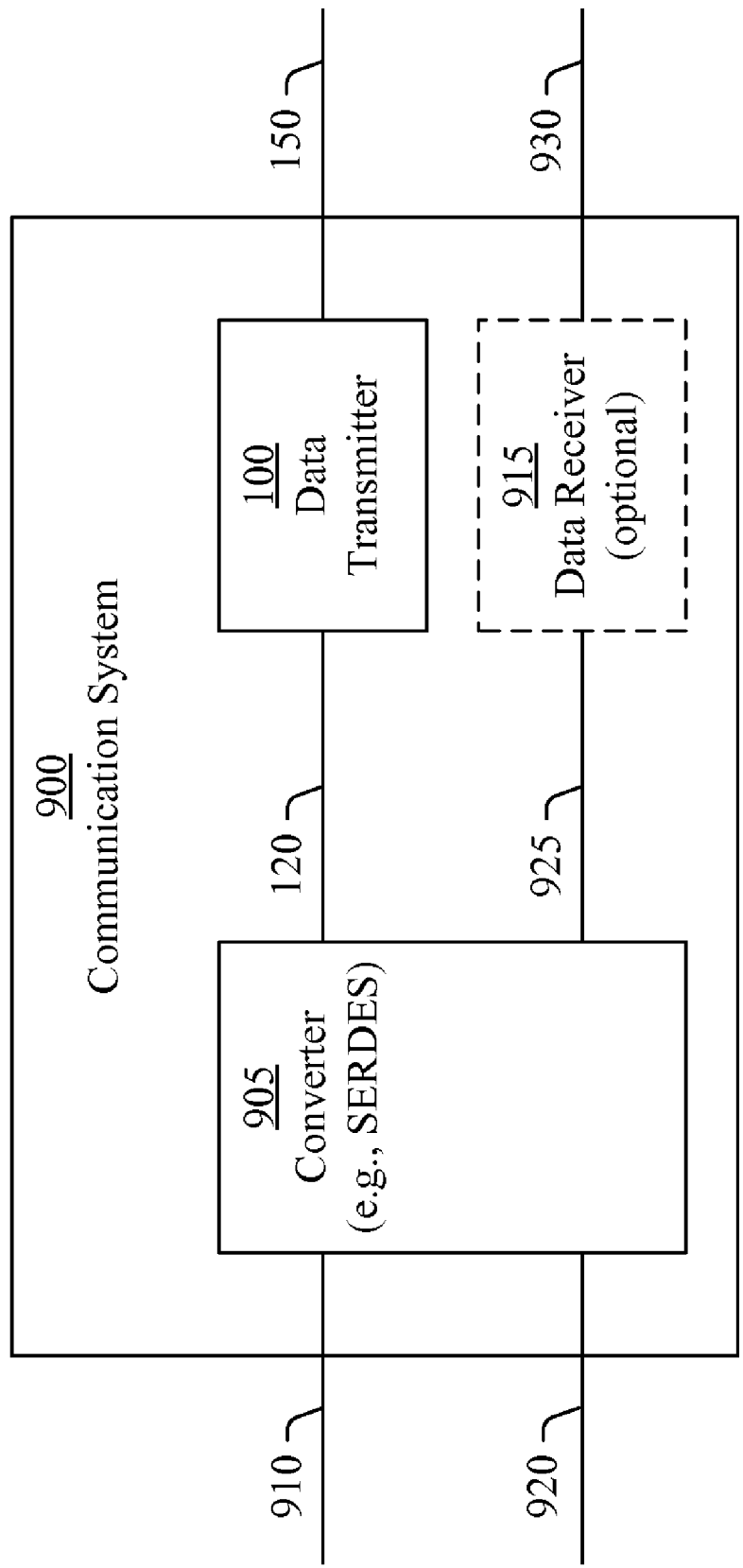
FIG. 9 is a block diagram of communication system, in accordance with an embodiment of the present invention.

FIG. 9 illustrates a communication system 900, in accordance with an embodiment of the present invention. The communication system 900 includes a converter 905 and the data transmitter 100. The converter 905 is coupled to the data transmitter 100. The converter 905 receives a parallel data signal 910 and serializes the parallel data signal 910 to generate the data signal 120. In turn, the data transmitter 100 pre-emphasized the data signal 120 to generate the pre-emphasized data signal 150, as is described more fully herein. Further, the data transmitter 100 transmits the pre-emphasized data signal 150 to a communication device (not shown).

In one embodiment, the communication system 900 includes an optional data receiver 915 coupled to the converter 905. In this embodiment, the data receiver 915 receives a data signal 930 and generates a serial data signal 925 representing data in the data signal 930. For example, the data receiver 915 may receive the data signal 930 from a communication device (not shown). The converter 905 converts the serial data signal 925 into a parallel data signal 920 and outputs the parallel data signal 920. The converter 905 may be, for example, a serializer-deserializer (SER-DES), as would be appreciated by those skilled in the art.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A system for pre-emphasizing a data signal, the system comprising:
    a data tap generator configured to receive the data signal and to generate a plurality of data tap signals, each data tap signal representing the data signal delayed by an integer multiple of a data period;
    a delay module configured to generate a delayed data signal representing a first data tap signal of the plurality of data tap signals further delayed by a delay time being less than the data period; and
    a filter module coupled to the data tap generator and the delay module, the filter module configured to multiply an amplitude of each data tap signal by a corresponding coefficient to generate a corresponding signal component, and to multiply an amplitude of the delayed data signal by a corresponding coefficient to generate a corresponding signal component, the filter module further configured to combine the signal components to generate a pre-emphasized data signal.

2. The system of claim 1, wherein the first data tap signal is a current cursor.

3. The system of claim 1, wherein the delay module is further configured to select the delay time based on a control signal to control a frequency bandwidth pre-emphasis of the pre-emphasized data signal.

4. The system of claim 1, wherein the filter module is further configure to select the coefficients based on a control signal to control an amplitude pre-emphasis of the pre-emphasized data signal.

5. The system of claim 1, wherein the filter module comprises a finite impulse response filter.

6. The system of claim 1, further comprising a converter configured to receive a parallel data signal and to serialize the parallel data signal to generate the data signal.

7. The system of claim 6, wherein the converter is a serializer-deserializer.

8. A method for pre-emphasizing a data signal, the method comprising:
    receiving a data signal;
    generating a plurality of data tap signals, each data tap signal representing the data signal delayed by an integer multiple of a data period;
    generating a delayed data signal representing a first data tap signal of the plurality of data tap signals further delayed by a delay time being less than the data period;
    multiplying an amplitude of each data tap signal by a corresponding coefficient to generate a corresponding signal component;
    multiplying an amplitude of the delayed data signal by a corresponding coefficient to generate a corresponding signal component; and
    combining the signal components to generate a pre-emphasized data signal.

9. The method of claim 8, wherein the first data tap signal is a current cursor.

10. The method of claim 8, further comprising selecting the delay time to control a frequency bandwidth pre-emphasis of the pre-emphasized data signal.

11. The method of claim 8, further comprising selecting the coefficients to control an amplitude pre-emphasis of the pre-emphasized data signal.

12. A system for pre-emphasizing a data signal, the system comprising:
    means for generating a plurality of data tap signals, each data tap signal representing the data signal delayed by an integer multiple of a data period;
    means for generating a delayed data signal representing a first data tap signal of the plurality of data tap signals further delayed by a delay time being less than the data period;
    means for multiplying an amplitude of each data tap signal by a corresponding coefficient to generate a corresponding signal component;
    means for multiplying an amplitude of the delayed data signal by a corresponding coefficient to generate a corresponding signal component; and
    means for combining the signal components to generate a pre-emphasized data signal.

13. The system of claim 12, wherein the delay time is less than the data period.

14. The system of claim 12, further comprising means for selecting the delay time to control a frequency bandwidth pre-emphasis of the pre-emphasized data signal.

15. The system of claim 12, further comprising means for selecting the coefficients to control an amplitude pre-emphasis of the pre-emphasized data signal.

16. The system of claim 12, further comprising means for receiving a parallel data signal and serializing the parallel data signal to generate the data signal.

17. A system comprising:
- means for generating a signal component based on a data signal for determining a frequency bandwidth pre-emphasis of the data signal;
- means for generating a plurality of signal components based on the data signal for determining an amplitude pre-emphasis of the data signal; and
- means for combining the signal components to generate a pre-emphasized data signal comprising the frequency bandwidth pre-emphasis and the amplitude pre-emphasis.

18. The system of claim 17, further comprising means for controlling the amplitude pre-emphasis of the data signal.

19. The system of claim 17, further comprising means for controlling the frequency bandwidth pre-emphasis of the data signal.

20. The system of claim 17, further comprising means for receiving a parallel data signal and serializing the parallel data signal to generate the data signal.

* * * * *